United States Patent
Matsubara

[11] 3,769,085
[45] Oct. 30, 1973

[54] INSULATED CABLE HAVING AN INSULATING SHIELDING LAYER

[75] Inventor: Hironaga Matsubara, Osaka, Japan

[73] Assignee: Sumitomo Electric Industries, Ltd., Osaka, Japan

[22] Filed: June 14, 1971

[21] Appl. No.: 152,800

[30] Foreign Application Priority Data
June 30, 1970 Japan.............................. 45/58638

[52] U.S. Cl................. 117/218, 117/226, 117/232, 174/120 C, 174/120 SC, 174/120 SR
[51] Int. Cl. ......................... B44d 1/18, H01b 3/30
[58] Field of Search..................... 117/218, 232, 226

[56] References Cited
UNITED STATES PATENTS

| | | | |
|---|---|---|---|
| 2,930,083 | 3/1960 | Vostovich et al............... | 117/232 X |
| 3,259,688 | 7/1966 | Towne et al................... | 117/232 X |
| 3,333,049 | 7/1967 | Humphrey et al.............. | 117/232 X |
| 3,096,210 | 7/1963 | Boonstra........................ | 117/218 X |
| 3,104,985 | 9/1963 | Williams et al................ | 117/232 X |
| 3,269,862 | 8/1966 | Lanza et al. ................... | 117/218 |
| 3,479,446 | 11/1969 | Arnaudin et al................ | 117/218 X |

Primary Examiner—Ralph Husack
Attorney—Richard C. Sughrue et al.

[57] ABSTRACT

An insulated cable having a cross-linked insulating layer and a cross-linked semiconductive insulation shielding layer, said layers having been formed by extrusion-coating simultaneously a composition for the insulating layer mainly composed of a polyolefin type polymer, such as polyethylene or a polyethylene copolymer and containing di-α-cumyl peroxide as the cross-linking agent and a composition for the semiconductive outer layer mainly composed of a polyolefin type polymer such as polyethylene or a polyethylene copolymer containing carbon black for providing the semiconductivity to said layer and 2,5-di-methyl-2,5-di-(t-butylperoxy)-hexyne-3 as the cross-linking agent and then cross-linking the layers by heating.

5 Claims, 2 Drawing Figures

PATENTED OCT 30 1973　　　　　　　　　　　　　　　　3,769,085
FIG. 1
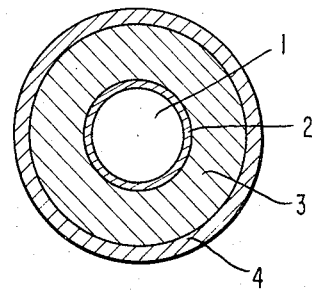
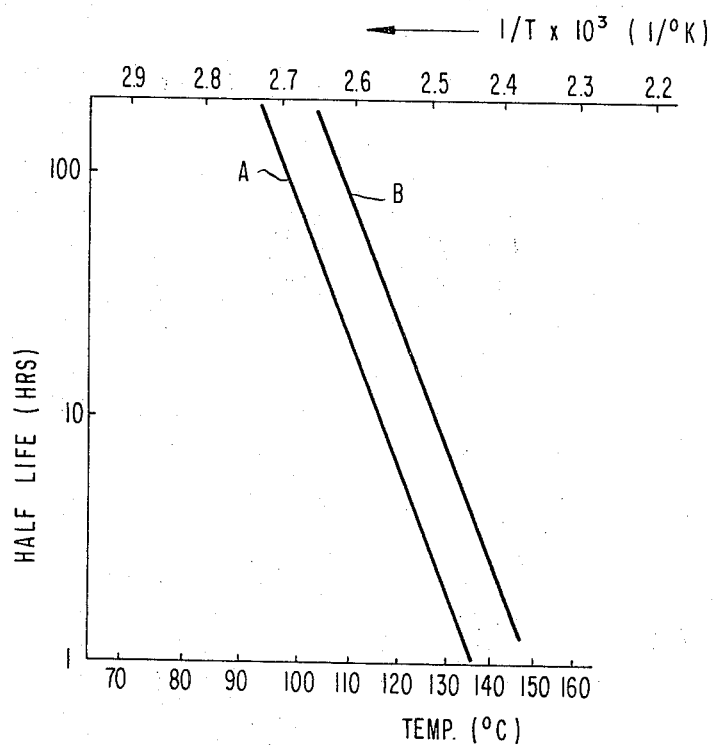
FIG. 2
INVENTOR
HIRONAGA MATSUBARA
BY Sughrue, Rothwell, Mion,
Zinn & Macpeak
ATTORNEYS

INSULATED CABLE HAVING AN INSULATING SHIELDING LAYER

This invention relates generally to an insulated cable having an insulation shielding layer and more particularly to the structure of an insulated cable chiefly consisting of a crosslinked polyethylene or a cross-linked polyethylene polymer having an insulation shielding layer.

Hitherto, in sheaths for cable of the aforesaid type, di-α-cumyl peroxide has generally been used as a cross-linking agent for the insulating layer and the semiconductive layer. However, if only di-α-cumyl peroxide is employed for causing the cross-linking reactions of both the insulating layer and the semiconductive layer, the following troubles will follow:

1. A large amount of heat is generated in the composition of the semiconductive layer in an extruder owing to a high content of carbon in the composition and thus the composition for the semiconductive layer causes a cross-linking reaction in the extruder at an ordinary extrusion temperature employed for forming such layers for cable, which results in making the formation of desired extrusion coating difficult in some cases.

2. Even if a semiconductive insulation shielding layer may be formed by extrusion, the following trouble will occur in the subsequent cross-linking step;

That is, the heating for cross-linking is conducted by heating the cable from the outer surface thereof by means of a heating pipe which contains saturated steam, etc. On the other hand, the layer for the cable is composed of a semiconductive insulating layer which contains a high amount of carbon and hence is comparatively highly heat-conductive and an insulating inner layer having a low heat conductivity. Accordingly, even if the cross-linking reaction in the semiconductive layer may be sufficient, the insulating inner layer is insufficiently cross-linked, which makes it difficult to obtain uniformly cross-linked layers.

Thus, it is accompanied with the aforesaid troubles to make a layer for cable by extruding simultaneously an insulating layer and a semiconductive insulating layer each containing a cross-linking agent in a conventional manner followed by cross-linking.

Therefore, an object of this invention is to provide a layer for cable formed by simultaneously extruding an insulating layer and a semiconductive insulating layer and cross-linking both layers without the aforesaid troubles.

The invention will now be explained in detail by referring to the accompanying drawings, in which:

FIG. 1 is a cross-sectional view showing an embodiment of the layer for cable of this invention and FIG. 2 is a graph showing the temperature characteristics of the cross-linking agents used in this invention.

Now, in FIG. 1 a semiconductive strand shielding layer 2 is formed around one or more conductors 1. The semiconductive strand shielding layer 2 may be formed by winding a semiconductive tape around the conductor 1 or the conductor 1 may be provided with a semiconductive coating composition by extrusion, etc. In the latter case, the formation of the semiconductive strand shielding layer by extrusion may be conducted simultaneously together with the formation of the insulating layer 3 and the semiconductor insulation shielding layer 4 as stated below.

The layer 3 formed on the semiconductive strand shielding layer 2 is a cross-linked insulating layer mainly composed of polyethylene or an ethylenic copolymer etc., and di-α-cumyl peroxide has been used as the cross-linking agent for the insulating layer 3. The semiconductive insulation shielding layer 4 is mainly composed of polyethylene or an ethylenic copolymer, etc., and carbon black for providing semiconductivity to the layer. In layer 4, 2,5-dimethyl-2,5-di-(t-butylperoxy)-hexyne-3 has been used as the cross-linking agent.

The important feature of the present invention is in the point of employing 2,5-dimethyl-2,5-di-(t-butylperoxy)-hexyne-3 as the cross-linking agent for the semiconductive insulation shielding layer on the insulating layer containing di-α-cumyl peroxide as the cross-linking agent. According to the present invention, uniformly and sufficiently cross-linked layers for the cable can be obtained by conducting the extrusion and cross-linking of both layers simultaneously.

That is, as will be clearly understood from the graph shown in FIG. 2 of the accompanying drawings, the cross-linking reaction temperature of polyethylene or an ethylenic copolymer, etc., by using 2,5-dimethyl-2,5-di-(t-butylperoxide)-hexyne-3 as the cross-linking agent (curve B) is higher than that in case of employing di-α-cumyl peroxide as the cross-linking agent (curve A), and, hence, the rate of the cross-linking reaction in the former case is lower than that in the latter case. Accordingly, because 2,5-dimethyl-2,5-di-(t-butylperoxy)-hexyne-3 was employed as the cross-linking agent for the carbon-containing composition of the semiconductive insulation shielding layer, the semiconductive insulating shielding layer can be extruded together with the inner insulating layer for coating without causing cross-linking reaction therein at an ordinary extrusion temperature for polyethylene or a polyethylene copolymer, etc., even if a large amount of heat is generated in the composition for the semiconductive insulationg shielding layer in the extruder owing to the presence of carbon black. Also, because the cross-linking agent giving a low rate of cross-linking reaction is used in the semiconductive insulation shielding layer, the insulation shielding layer is cross-linked almost simultaneously when the inner insulating layer which contains the cross-linking agent having a higher rate of cross-linking reaction is cross-linked by heating the extruded cable from the outer surface of the semi-conductive insulation shielding layer by a conventional means and cable having uniformly cross-linked layers is obtained.

The examples of this invention are illustrated in the following table together with comparison examples.

TABLE

| Comparison example or example | Composition for insulating layer | Cross-linking agent for insulating layer | Composition for semi-conductive insulating shielding layer | Cross-linking agent for insulation shielding layer | Possible continuous running time for simultaneous extrusion and crosslinking |
|---|---|---|---|---|---|
| Comparison example 1 | Low density polyethylene M.I. = 1.0. | DCP¹ 2PHR | DPD 6169² containing carbon black. | DCP 1 PHR | 2 hrs. |
| Comparison example 2 | do | do | do | DCP 2 PHR | Do. |

| | | | | | |
|---|---|---|---|---|---|
| Comparison example 3 | do | do | do | DCP 3 PHR | 1 hr. |
| Comparison example 4 | do | do | do | DCP 2 PHR | 2 hrs. |
| Comparison example 5 | Added with 50 PHR of talc in comparison example 1. | do | do | do | Do. |
| Comparison example 6 | Added with 50 PHR of clay in comparison example 1. | do | do | do | Do. |
| Comparison example 7 | Ethylene-vinyl acetate copolymer M.I.-3; amount of vinylacetate = 20%. | do | do | do | Do. |
| Example 1 | Comparison example 1. | do | do | X[3] 1 PHR | Above 100 hrs. |
| Example 2 | do | do | do | X 2 PHR | Do. |
| Example 3 | do | do | do | X 3 PHR | Do. |
| Example 4 | do | do | do | X 4 PHR | 80 hrs. |
| Comparison example 8 | do | do | do | X 5 PHR | 30 hrs. |
| Comparison example 9 | do | do | EVA[4] contains carbon black VA content = 1.5%. | DCP 2 PHR | 2 hrs. |
| Comparison example 10. | do | do | EVA[4] contains carbon black VA content = 25%. | do | Do. |
| Comparison example 11. | do | do | EVA[4] contains carbon black VA content = 35%. | do | Do. |
| Comparison example 12. | do | do | VA content = 45% | do | Do. |
| Comparison example 13. | do | do | Blend of 80 PHR of EVA (VA=45%) and 20 PHR of Semigraft-GF added with carbon black. | do | Do. |
| Comparison example 14. | do | do | Blend of 60 PHR of EVA in a comparison example 13 and 40 PHR of semigraft. | do | Do. |
| Example 5 | The same of comparison example 9. | The same of comparison example 9. | The same of comparison example 9. | X 2 PHR | Above 100 hrs. |
| Example 6 | The same of comparison example 10. | The same of comparison example 10. | The same of comparison example 10. | do | Do. |
| Example 7 | The same of comparison example 11. | The same of comparison example 11. | The same of comparison example 11. | do | Do. |
| Example 8 | The same of comparison example 12. | The same of comparison example 12. | The same of comparison example 12. | do | Do. |
| Example 9 | The same of comparison example 13. | The same of comparison example 13. | The same of comparison example 13. | do | Do. |
| Example 10 | The same of comparison example 14. | The same of comparison example 14. | The same of comparison example 14. | do | Do. |

[1] Di-α-cumyl peroxide.
[2] Ethylene acrylate copolymer (produced by UCC Co. in USA).
[3] 2,5-dimethyl-2', 5'di-(tert-butyl peroxy)hexyne-3.
[4] Ethylene-vinylacetate-vinylchloride terpolymer (Sumitomo Chem. Co.) copolymer. The terminology PHR indicates "per 100 resin or rubber"; i.e., the amount added is based on 100 grams of the resin or the rubber.

What is claimed is:

1. An insulated cable consisting essentially of a conductor, a first cross-linked insulating layer surrounding said conductor and an outer cross-linked semiconductive insulation shielding layer surrounding said first layer, said first layer consisting essentially of polyethylene or an ethylene-containing copolymer cross-linked with di-α-cumyl peroxide and said outer layer consisting essentially of polyethylene or an ethylene-containing copolymer cross-linked with 2,5-di-methyl-2,5-di(t-butylperoxy)-hexyne-3 and containing a sufficient amount of carbon black to make said outer layer semiconductive.

2. The insulated cable of claim 1 wherein said first cross-linked insulating layer and said outer cross-linked semiconductive insulation shielding layer consist essentially of simultaneously extruded and simultaneously cross-linked layers.

3. The insulated cable of claim 2 further consisting essentially of a semiconductive layer intermediate said conductor and said first cross-linked insulating layer.

4. The insulated cable of claim 2 wherein at least one of said ethylene-containing copolymers is an ethylene-acrylate copolymer, an ethylene-vinyl acetate copolymer or an ethylene-vinyl acetate-vinyl chloride terpolymer.

5. A process for producing an insulated cable comprising simultaneously extruding, around a conductor, a first cross-linkable insulating layer surrounding said conductor and an outer cross-linkable semiconductive insulation shielding layer surrounding said first layer, said first layer consisting essentially of non-cross-linked polyethylene or an ethylene-containing copolymer and di-α-cumyl peroxide and said outer layer consisting essentially of non-cross-linked polyethylene or an ethylene-containing copolymer and 2,5-di-methyl-2,5-di-(p-butylperoxy)-hexyne-3 and containing a sufficient amount of carbon black to make said outer layer semiconductive; and subsequently simultaneously cross-linking said first layer and said outer layer.

* * * * *